United States Patent
Ikuta

(10) Patent No.: US 6,412,720 B1
(45) Date of Patent: Jul. 2, 2002

(54) DUAL-BEARING REEL BRAKE DEVICE AND DRAG COVER ATTACHMENT STRUCTURED THEREFOR

(75) Inventor: Takeshi Ikuta, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/526,859

(22) Filed: Mar. 16, 2000

(30) Foreign Application Priority Data

Mar. 19, 1999 (JP) ............................................. 11-075395
May 7, 1999 (JP) ............................................. 11-127335

(51) Int. Cl.[7] ............................................. A01K 89/015
(52) U.S. Cl. ....................................... 242/269; 242/319
(58) Field of Search ........................... 242/319, 269, 242/270, 271

(56) References Cited

U.S. PATENT DOCUMENTS

| | | | | |
|---|---|---|---|---|
| 2,255,703 A | * | 9/1941 | Grieten | 242/270 |
| 2,462,365 A | * | 2/1949 | Crawford | 242/271 |
| 4,546,937 A | * | 10/1985 | Hideo | 242/271 |
| 4,813,629 A | * | 3/1989 | Hashimoto et al. | 242/319 |
| 4,852,826 A | * | 8/1989 | Sato | 242/270 |
| 5,308,018 A | * | 5/1994 | Furomoto | 242/271 |
| 5,318,246 A | * | 6/1994 | Ikuta | 242/271 |
| 6,286,773 B1 | * | 9/2001 | Ikuta | 242/319 |

* cited by examiner

*Primary Examiner*—Emmanuel M. Marcelo
(74) *Attorney, Agent, or Firm*—Shinjyu Global ip Couselors, LLP

(57) ABSTRACT

A double-drag type lever-drag mechanism for a double-bearing trolling reel. The drag mechanism is configured to improve overall reel braking and drag performance by securing the brake release state reliably and by a design that curbs increase in spool inertia and provides for ease of operation and precision in attaching the drag cover. The lever drag mechanism 7 brakes the spool 3 rotation in the line spool-out direction, and is equipped with a brake disk 25 non-rotatably fitted to one end of the spool such to be axially shiftable a predetermined distance. Sandwiching the brake disk 25 between friction disk 26, immobilized against axially outward movement, and axially shiftable friction disk 27 rotates the drag/brake disks 25–27 unitarily with the spool 3. Against the spool 3 a coil spring 28 urges the brake disk 25 away from the spool 3. A shifting mechanism 29 reciprocates the spool 3 and drag/brake disks 25–27 axially. The mounting configuration for the drag cover includes a circular groove 3c radially beyond which is a plurality of circumferentially spaced threaded holes 3d in the end face of the spool 3; a tubular centering portion 41c that snugly fits into the circular groove 3c, radially extending from which is a ring-shaped mounting portion 41b; an O-ring 42 in the circular groove 3c making sealing contact circumferentially with the tubular centering portion 41c; and a plurality of machine screws 44 passing through-holes in the mounting portion 41b and screwed into the threaded holes 3d.

24 Claims, 10 Drawing Sheets

DUAL-BEARING REEL BRAKE DEVICE AND DRAG COVER ATTACHMENT STRUCTURED THEREFOR

BACKGROUND OF THE INVENTION

1. Technical Field

The present invention concerns fishing reel brake devices and associated drag cover attachments for the spool rotation transmitting mechanism that transmits to the spool rotation from the handle mounted rotatably on the reel main unit. More particularly, the invention relates to a dual-bearing reel brake device provided in the course of the rotation transmitting mechanism for braking rotation in the line spool-out direction, and to drag covers non-rotatably mounted laterally of, and at a spacing from, the spool to house its drag disk.

2. Description of Related Art

One class of dual-bearing reels that is known is the trolling reels, which are reels for catching large fish. The trolling reel is provided with a spool around the perimeter of which is wound fishing line, a spool spindle that supports the spool, and a reel main unit that centrally supports the spool spindle. Provided on the reel main unit is a handle spindle that is disposed such that it is parallel to the spool spindle and protrudes exteriorly. The handle is fastened to the tip of the handle spindle. Further, a rotation transmission mechanism is provided between the handle spindle and the spool to transmit rotation from the handle spindle to the spool. A lever drag mechanism for braking rotation in the line spool-out direction of the spool is provided in the course of the rotation transmission mechanism.

Double-drag type lever mechanisms that yield strong drag forces are known as one kind of lever drag mechanism mounted on trolling reels. This lever drag mechanism is disposed to face one end surface of the spool on the side away from the side where the handle is mounted. The lever drag mechanism comprises a brake disk that is fitted non-rotatably to, and spaced apart from one end face of, the spool; first and second drag disks sandwiching the brake disk, disposed in opposition across an interval; and a shifting means for reciprocatingly shifting the spool and the second drag disk in the spool axial direction to clasp the brake disk with the first and second drag disks.

The brake disk corresponds to the disk brake disk of a vehicle, and the two drag disks correspond to calipers. The brake disk is mounted on the spool such that it is shiftable a predetermined distance in the spool axial direction. The first drag disk is fitted non-rotatably on the spool spindle, and cannot rotate in the line spool-out direction in relation to the reel main unit. Moreover, the first drag disk cannot move in the axial direction of the spool spindle. The second drag disk is fitted on the spool spindle to be non-rotatable but axially shiftable, and rotates by coupling with the first drag disk.

The shifting means is provided with a brake operating lever that is fitted to be pivotable around the spool spindle, and a shifting mechanism that converts the swing of the brake operating lever into reciprocating movement in the spool axial direction. The moving mechanism has a cam mechanism that via bearings and pinion gears disposed around the spool axle shifts the spool and the second disk member axially in one direction in response to the swing of the brake operating lever. The moving mechanism further has a return spring that causes the spool and the second disk member, which have been pressed by the cam mechanism, to move in the other axial direction.

In a double drag type drag mechanism thus configured, when the brake manipulation lever is swung in one direction, the spool and second disk member move in the other axial direction in response to the swing. The brake disk member moves together with the spool, and the spool is braked by the drag force corresponding to the force of pressure when both disk members contact the brake disk member. In addition, when the brake manipulation lever is swung in the other direction, the return spring urges the spool and the second disk member in response to the swing, they gradually move in the other axial direction, and when both disk members have moved away from the brake disk member, the spool can freely rotate. The drag force therein can be adjusted by adjusting the swing position of the brake manipulation lever, which causes the pressure contact force between the two disk members and the brake disk member to change.

In the conventional drag mechanism as just described, when for example freeing the spool to rotate in order to cast by putting it into brake-release from being braked, the timing at which the two disk members break away from the brake disk tends to vary widely. This seems to be because the axial behavior of the brake disk is unstable due to the fact that the brake disk is shiftable axially as fitted to the spool. With the break away timing thus varying widely, instances may also arise in which the brake disk remains in contact as is with one or the other of the disk members, wherein the brake-release state that frees the spool to rotate is not secured.

Because the drag performance fluctuates when water intrudes onto the friction surfaces, these sorts of disks are covered with watertight drag covers. The drag cover has room for housing the disks, and is screw-attached to the lateral end of the spool by turning the entire body. Accordingly, there are female threads on the outside of the cover for screwing into the spool, and male threads on the lateral end face of the spool that mate with the female threads. Spindle-shaped parts—the spool spindle and the drag-disk link—pass through the center of the drag cover, and a seal is fitted to the center of the drag cover at a gap from the spindle-shaped parts. This accordingly prevents liquid intrusion from the inner- and outer-peripheral sides of the drag cover.

Thus with the drag cover attachment as conventionally structured, the entire drag cover is turned to attach it to the spool by screwing the male threads into the female threads. Controlling the tightening torque is therefore difficult, and water is permitted to intrude simply by the cover becoming loose, or if it otherwise will not loosen the disks cannot be serviced. In addition, wobble in the screw makes it difficult to center the drag cover accurately on the spool. In particular, in large-scale trolling reels that have a large diameter spool, it is even more troublesome to control the tightening torque and hard to conduct accurate centering. For this reason, it is difficult to attach the drag cover readily onto the spool with precision. Further, the fact that the portion where the male and female threads screw together is formed on the outermost periphery of the spool, or of a component that rotates unitarily with the spool, means that portion necessarily will be thick, which increases the inertia of the spool.

SUMMARY OF THE INVENTION

An object of the present invention is to enable the brake-release state in a double-drag type lever drag mechanism to be secured reliably.

Another object of the invention is to structure a drag cover attachment that can be readily attached with precision, and that limits increase in spool inertia.

A further object is to improve braking and drag performance in a dual-bearing fishing reel by configuring the attachment of the drag cover and the spool for watertight precision and for minimized spool inertia.

The dual-bearing reel brake device related to a first aspect of the present invention is a device for braking the rotation in the line spool-out direction of the spool provided in the course of the rotation transmission mechanism that transmits to the spool rotation from the handle that is mounted rotatably on the reel main unit of a dual-bearing reel, wherein a brake disk member, a first disk member, a second disk member, a first urging member and a moving means are provided. The brake disk member is a member that is mounted separated by a gap from one end of the spool, that cannot rotate, and that is mounted to move freely a predetermined distance in the axial direction of the spool. The first disk member is a member that transmits the rotation from the handle, that is disposed facing the surface of the brake disk member on the opposite side of the spool, that prevents rotation in the line spool-out direction in relation to the reel main unit, and that, of the axial directions, cannot move at least in the direction moving away from the brake disk member. The second disk member is a member that is disposed facing the surface of the spool side of the brake disk member, that rotates by linking with the first disk member, and that can move freely in the axial direction such that it loses contact with the first disk member. The first urging member is a member that urges the brake disk member in the direction moving away from the second disk member. The moving means is a means for causing the spool and the second disk member to have reciprocating movement in the axial direction such that the brake disk member can be held between the first and second disk members.

In this brake device, when the moving means causes the spool and second disk member to move in the direction approaching the first disk member, the brake disk member, which is urged by the first urging member in the direction moving away from the second disk member, moves together with the spool in the direction of the first disk member, which cannot move in the direction moving away from the brake disk, and makes contact therewith. When the brake disk makes contact with the first disk member, only the spool and the second disk member move, making the gap with the brake disk member smaller. In this way, when the second disk member makes contact with the brake disk member by moving further, the brake disk member is held between both disk members. As a result, because the rotation of both disk members in the line spool-out direction is prohibited, the rotation of the brake disk member in the line spool-out direction is braked, and the spool that is mounted such that the brake disk member cannot rotate is braked. Then, when the second disk member is made to move further, the pressure contact force of both disk members becomes strong in relation to the brake disk member, and the brake force (drag force) becomes even greater.

When the moving means causes the spool and second disk member to move in the opposite direction from out of the brake state, the pressure contact force of both disk members gradually becomes weaker, the drag force gradually becomes smaller, and the second disk member moves away from the brake disk member. At this time, the brake disk member is urged by the first urging member in the direction moving away from the second disk member, and therefore the state of contact with the first disk member is supported until the spool moves a predetermined distance. For this reason, in this state a slight drag acts on the spool through the brake disk member. Then, when the spool moves a predetermined distance, the brake disk member moves away from the second disk member, enters the damp release state, and the spool can freely rotate.

Here, because the first urging member urges the brake disk member in the direction moving away from the second disk member and the brake disk means is mounted on the spool such that it can freely move a predetermined distance, the behavior of the brake disk member in the axial direction is stable and reliably moves away from the second disk member. In addition, the timing by which the first disk member moves away from the brake disk member and enters the brake release state is the point in time when the spool has moved a predetermined distance, and this timing becomes fixed. For this reason, there can be a reliable transition from the brake state to the brake release state, and the brake release state can be reliably guaranteed.

The dual-bearing reel brake device in connection with a second aspect of the invention involves a device as described in the first aspect, wherein the first and second disk members are mounted non-rotatably on the spool spindle, which passes through the center of the spool and on which the spool is supported to rotate freely. In this case, because the first disk member and the second disk member are mounted non-rotatably on the spool spindle, a configuration that allows rotation by linking both disk members can be easily realized.

The dual-bearing reel brake device in connection with a third aspect involves a device as described in the first aspect and second aspects, wherein the moving means has a brake manipulation member that is provided to freely move on the reel main unit, a pressing means that presses the spool and second disk member in response to the movement in one direction of the brake manipulation member, and causes them to move in the axial direction that approaches the first disk member, and a second urging member that urges the second disk member for causing the spool and second disk member to move in the other axial direction in response to the movement of the brake manipulation member in the other direction. In this case, only the spool and second disk member need be pressed, and the configuration of the pressing means becomes simple. Moreover, if a cam mechanism and the like is used, even if the amount that the brake manipulation member moves is small, a relatively large distance in the axial direction can be pressed.

The dual-bearing reel brake device according to a fourth aspect of the invention involves a device as described in the third aspect, wherein a second urging member urges both members in directions such that the second disk member and the first disk member are caused to move apart. In this situation, because both disk members are urged in the directions to move apart, the release of both disk members and the movement of the second disk member and the spool in the other direction of the axial direction can be realized with a single urging member.

The dual-bearing reel. brake device according to a fifth aspect of the invention involves a device as described in the third and fourth aspects, wherein the brake manipulation member is mounted on the reel main unit to freely swing around the spool axis, the spool is mounted rotatably around the spool rotational spindle, the pressing means, in response to the swing of the brake manipulation member, presses and moves the spool in one direction through members disposed on the periphery of the rotational spindle, and also moves the second disk member in one direction by pressing it via the spool. In this situation, because movement is caused in one direction by pressing the spool via members such as bearings and gears disposed on the periphery of the spool spindle and by pressing the second disk member through the spool, the gap between the spool and the second disk member is always the same, and it is easy to make the initial brake timing fixed.

The dual-bearing reel brake device according to a sixth aspect of the invention involves a device as described in the first through fifth aspects, wherein when the moving means has moved the spool and the second disk member in the other direction, the gap between the first disk member and the brake disk member becomes larger than the gap between the second disk member and the brake disk member. In this situation, when brake is released, the distance after the brake disk member moves away from the first disk member can become longer, and the brake release state can be guaranteed in a wider range. Moreover, when brake, the time (distance) after the first disk member makes contact with the brake disk member up to when the second disk member makes contact with the brake disk member becomes shorter (during which time the spool approaches the brake disk member by resisting the urging force of the first urging member), the time that the brake disk makes contact with only the first disk member is shortened, and the drag force can be effectively heightened.

The dual-bearing reel brake device according to a seventh aspect of the invention involves a device as described in the first through sixth aspects, wherein the brake disk member is mounted on the end surface of the side of the spool away from the handle. In this case, because the brake device is disposed on the side away from the handle, where there is a comparatively large margin of space, a double drag type brake device can be disposed without inviting an increase in the scale of the reel.

The dual-bearing reel brake device according to an eighth aspect of the invention involves a device as described in the first through seventh aspects, wherein the brake disk member is disposed non-rotatably on the spool by using a rotational stop member that is disposed on the outward radial direction of the first and second disk members. In this situation, the brake disk member is rotationally stopped on the spool using a rotational stop member on the outward portion of both disk members, where there is a comparatively large margin of space, and therefore the configuration of the rotational stop member becomes simple.

The dual-bearing reel brake device according to a ninth aspect of the invention involves a device as described in the first through eighth aspects, wherein the brake disk member moves only a predetermined distance by restricting the movement in the axial direction using a restricting member that is disposed on the outward radial direction of the first and second disk members. In this situation, because the movement of the brake disk member has restricted by a restricting member on the outward portion of both disk members, where there is a comparatively large margin of space, the configuration of the restricting member becomes simple.

The dual-bearing reel brake device according to a tenth aspect of the invention involves a device as described in the first through ninth aspects, and the rotational stop member is also used as a restricting member. In this situation, because both members are combined in one, the configuration of both members becomes even simpler.

According to an eleventh aspect of the invention, a dual-bearing reel drag-cover mounting configuration is for mounting a drag cover non-rotatably to a lateral end of a rotating member that rotates unitarily with the spool of a dual-bearing reel. The drag cover has space to house the drag disks. The drag-cover mounting configuration includes a centering means, a seal means, a plurality of female screw parts, a plurality of screw through-holes and a plurality of screw members. The centering means is a means provided on opposing surfaces of the rotating member and the drag cover for the purpose of concentrically disposing the rotating member and the drag cover. The seal means is provided such that it is able to make contact with the rotating member and the drag cover, and has the purpose of preventing the intrusion of liquid into the space from the outside. The plurality of female screw parts are formed on the surface of the side of the rotating member (or drag cover) facing the drag cover (or rotating member), close to the seal means, and separated by gaps in the peripheral direction. The plurality of screw through-holes are formed on the drag cover (or rotating member) in positions facing the plurality of female screw parts and separated by gaps in the peripheral direction. The plurality of screw members are members that pass through the screw through-holes and screw into the plurality of female screw parts.

In this drag-cover mounting configuration, when assembling the drag case on the rotating member (including spool itself), the drag cover and the rotating member are centered by the centering means, and further, the drag cover and the rotating member are sealed by the seal means. At this time, the screw through-holes are placed to face the female screw parts. In this manner, the drag cover is centered on the rotating member, and the seal member prevents the intrusion of liquids into the interior space from the drag cover. Then, the screw members are passed through the through-holes and screwed into the female screw parts. With this, the assembly of the drag case onto the rotating member is complete. Here, because the centering means and the seal means are provided, the drag cover is centered on the rotating member, and the interior of the drag cover is sealed just by assembling the drag cover. Moreover, because the drag cover is assembled by screw members, it is easy to control tightening torque. For this reason, the drag cover can be precisely and easily assembled on the rotating member. In addition, because the drag cover is assembled using screw members, it is not necessary to form thick screw parts on the outer periphery of the drag cover and on the outer peripheral side of the rotating member, and the increase in spool inertia can be controlled.

A drag-cover mounting configuration according to a twelfth aspect of the invention is a structure as described in the eleventh aspect, further wherein the centering means has an outer peripheral side wall surface (or inner peripheral side wall surface) of a circular groove formed on the rotational member (or drag cover) concentric to the center of the rotational axis of the rotating member, and an outer peripheral surface (or inner peripheral surface) that can contact said wall surface of the cylindrical part formed to protrude from the side surface of the drag cover (or rotating member) toward the circular groove. The seal member is a circular elastic body disposed between the inner peripheral side wall surface (or outer peripheral side wall surface) and the inner peripheral side surface (or outer peripheral side surface) of the cylindrical part such that it can make contact with both surfaces. In this case, when the cylindrical part is inserted in the circular groove, the outer peripheral side wall surface (or inner peripheral side wall surface) of the circular groove and the outer peripheral surface (or inner peripheral surface) of the cylindrical part make contact, and the drag cover is centered on the rotating member. Moreover, when disposing a circular elastic body such as an O-ring between the inner peripheral side wall surface (or outer peripheral side wall surface) of the circular groove and the inner peripheral surface (or outer peripheral surface) of the cylindrical part, the circular elastic body makes contact with both surfaces, the gap between the rotating member and the drag cover is sealed, and the intrusion of liquid into the interior is prevented. Here, the centering structure and the seal space can be realized in a single group configuration by using a circular groove and a cylindrical part.

A drag-cover mounting configuration according to a thirteenth aspect of the invention is a structure as described in the twelfth aspect, further wherein the centering means has a annular step portion formed on the side face of the rotating member (or drag cover) protruding concentrically with the axis through the rotational center of the rotating member. The outer peripheral surface of the annular step portion contacts the inner peripheral surface of an annular recess formed in the side wall of the drag cover (or rotating member). Herein, structuring the centering means as a complementary mating known as a spigot joint between the annular step and annular recess simplifies the centering means configuration and facilitates handling.

A drag-cover mounting configuration according to a fourteenth aspect of the invention is a structure as described in the thirteenth aspect, further wherein the seal means is a circular elastic body that is housed in a circular groove part formed on the outer peripheral surface (or inner peripheral surface) and that can make contact with the inner peripheral surface (or outer peripheral surface). In this case, because the space between both members is sealed by mounting a circular elastic body such as an O-ring in the circular groove part formed on the inner peripheral surface or outer peripheral surface that constitutes the centering means, a reliable seal can be made by the centering portion.

A drag-cover mounting configuration according to a fifteenth aspect of the invention is a structure as described in the thirteenth aspect, further wherein the seal means is a circular elastic body on the outside of the centering means that is housed in the circular seal groove formed on the side surface of the rotating member (or drag cover) and that can make contact with the side wall of the drag cover (or rotating member). In this case, a commercial O-ring or oil seal with a lip and the like can be used as the circular elastic body, and a low-cost seal can be realized.

A drag-cover mounting configuration according to a sixteenth aspect of the invention is a structure as described in the thirteenth aspect, further wherein the seal means is a disk-shaped ring member held between the side surface of the rotating member (or drag cover) and the side surface of the drag cover (or rotating member). In this case, a commercial gasket for a pipe flange can be used as the disk-shaped ring member, and a low-cost seal can be realized.

A dual-bearing reel drag-cover mounting configuration according to a seventeenth aspect of the invention is a drag cover structured for mounting non-rotatably on a rotating member that rotates unitarily with the spool of a dual-bearing reel, having a space that can house the drag disks therein, wherein a circular groove part, a cylindrical centering portion, a plurality of female screw parts, an assembly part, a ring-shaped seal member made of an elastic body, and a plurality of screw members are provided. The circular groove part is formed concentrically with the rotating member on the side surface of one or the other of either the rotating member or the drag cover, said surface facing the other member. The cylindrical centering portion is formed on the outer peripheral surface of the other member such that it tightly fits the side wall of the circular groove part, for the purpose of mounting the drag cover concentrically with the rotating member. The plurality of female screw parts are separated by gaps in the peripheral direction on the outer peripheral surface of the circular groove part, and are formed on the side surface of one member of either the rotating member or the drag cover, said surface facing the other member. The assembly part is provided on the other member to be able to contact the side surface of the one member at the outside from the circular groove part, and a plurality of screw insertion holes are formed on the assembly part in locations facing the plurality of female screw parts separated by gaps in the peripheral direction. The ring-shaped seal part made of an elastic body is mounted to be able to make contact with the peripheral surface of the centering portion and the wall surface of the circular groove part. A plurality of screw members are screwed into the plurality of female screw parts through the screw insertion holes.

With this mounting configuration, when assembling the drag case on the rotating member (including the spool itself), the seal member is first mounted on the peripheral surface of the centering portion, and the centering portion is fit into the circular groove part in this state. Therein, the screw through-holes are mated to face the female screw parts. Then, the drag cover is centered on the rotating member by fitting the peripheral surface of centering portion tightly onto the wall surface of the circular groove part, and liquid is prevented from intruding from the drag cover into the interior space by the seal member making contact with the outer peripheral surface of the centering portion and the wall surface of the outer peripheral side of the circular groove part. Then, the screw members are passed through the screw through-holes and are screwed into the female screw parts. In this manner, the assembly of the drag case onto the rotating member is complete. Here, because the centering portion tightly fits the circular groove part, the drag cover is centered concentrically with the rotating part just by assembling the drag cover. In addition, because screw members are used to assemble the drag cover, it is easy to control the tightening torque. For this reason, the drag cover can be precisely and easily assembled on the rotating member. Moreover, because screw members are used to assemble the drag cover, it is no longer necessary to form thick screw parts on the outer peripheral part of the drag cover and on the outer peripheral side of the rotating member, and the increase in spool inertia can be suppressed.

A drag-cover mounting configuration according to an eighteenth aspect of the invention is a structure as described in the seventeenth aspect, further provided with a circular seal stop groove formed to be able to stop the seal member on the outer peripheral surface of the centering portion. In this case, because the seal member is stopped and does not easily move when it is mounted on the seal stop groove, the drag cover assembly operation becomes even simpler.

A drag cover mounting configuration according to an eighteenth aspect of the invention is a structure as described in the seventeenth and eighteenth aspects, wherein the seal member is an O-ring. In this case, because it is an O-ring that is commercially available, the cost of the seal member can be reduced.

A drag cover according to a twentieth aspect of the invention is a structure as described in the eighteenth and nineteenth aspects, further provided with a removal groove part formed in a circular shape on the outside part of the drag cover. In this case, even if the centering portion is tightly fitted to the circular groove, the drag cover becomes easy to remove by prying in the removal groove part with a tool or finger.

A drag-cover mounting configuration according to a twenty-first aspect of the invention is a structure as described in the eleventh through twentieth aspects, wherein the rotating member is the spool itself.

A drag-cover mounting configuration according to a twenty-second aspect of the invention is a structure as described in the eleventh through twenty-first aspects, wherein the drag disk protrudes in the axial direction from the inside of the drag cover, and a waterproof seal is mounted between the drag cover and the protruding part of the drag disk. In this case, even if the drag disk protrudes to the outside, no liquid will intrude from there because there is a seal between that part and the drag cover. Moreover, because the drag cover and the rotating member are centered, the waterproof seal equally touches the drag cover and the drag disk when centering the rotating member and the drag disk, and this improves the seal performance of the waterproof seal.

The foregoing and other objects, features, aspects and advantages of the present invention will become more apparent from the following detailed description in conjunction with the accompanying drawings.

DETAILED DESCRIPTION OF THE PREFERRED EMBODIMENTS

Figure 1:
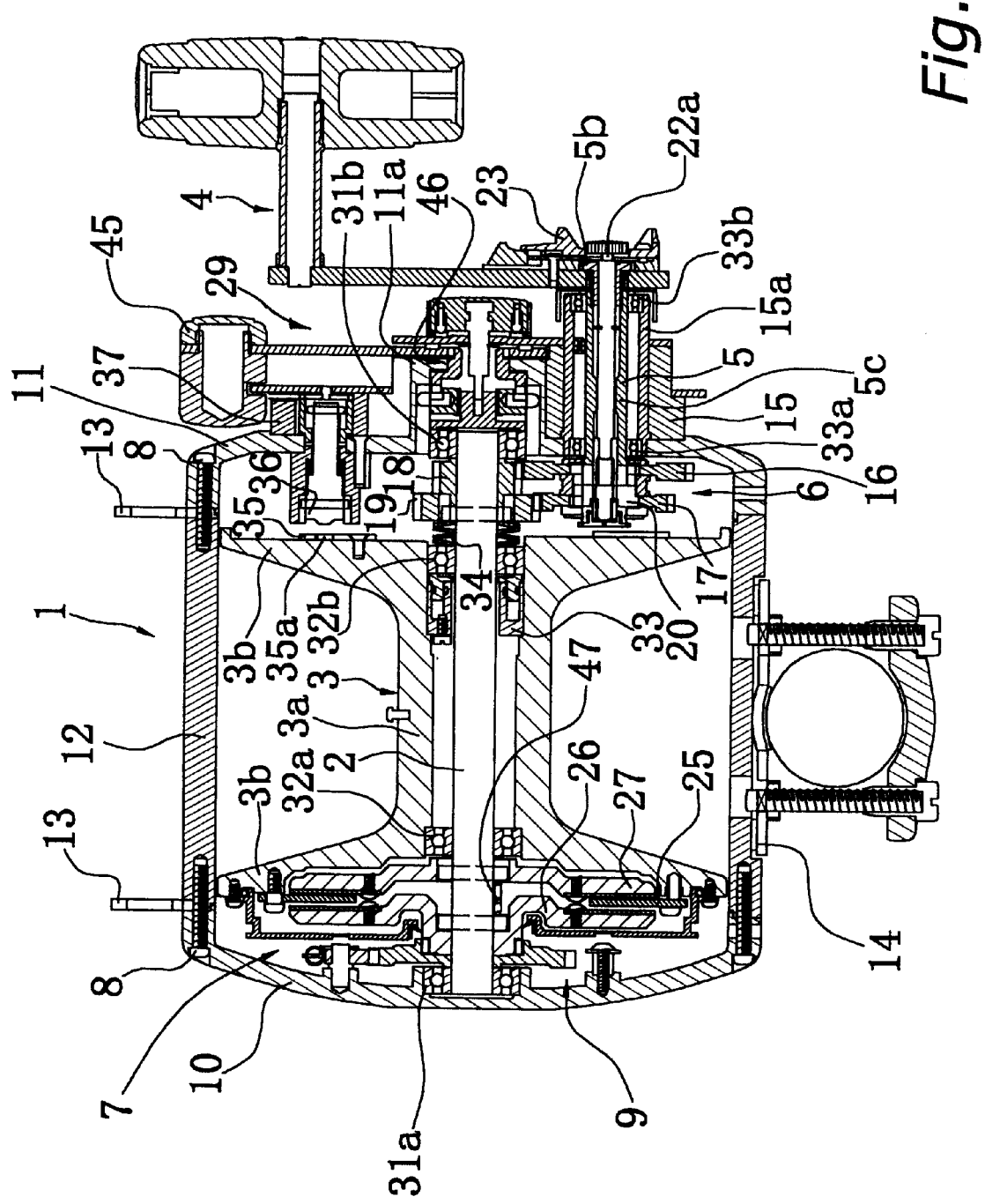
FIG. 1 is a is a cross-sectional diagram of a trolling reel based on one embodiment of the present invention.

In FIG. 1, a trolling reel, which is a dual-bearing reel that adopts one embodiment of the present invention, is provided with a cylindrical reel main unit 1, a spool spindle 2 that is rotatably mounted centrally in the reel main unit 1, a spool 3 that is rotatably supported on the spool spindle 2 and cannot shift axially relative to the reel main unit 1, and a handle 4 that is disposed on the side of the reel main unit 1. Inside the reel main unit 1, the trolling reel is provided with a rotation transmission mechanism 6 that transmits rotation of the handle 4 to the spool 3, a lever drag mechanism 7 that brakes rotation in the line spool-out direction of the spool 3, and a reverse-rotation check mechanism 9 that regulates the rotation in the line spool-out direction of the spool 3.

The reel main unit 1 has a perforated metal cylindrical reel body 12, to which a pair of left and right metal dish-shaped side plates 10 and 11 are joined on either ends by concentric spigot joints and secured by a plurality of fixing screws 8. The side plates 10 and 11 support at nearly their centers either end of the spool spindle 2 such that it can freely rotate. In order to support the spool spindle 2, an axially protruding boss 11a is provided on the side plate 11 on the handle 4 end, and a thick disk-shaped bearing block 15 for mounting a handle spindle 5 of the handle 4 is stop-screwed on an outer peripheral side of the boss 11a.

Harness lags 13, for fitting on a reel harness, are mounted at a spacing on the upper part between the reel body 12 and the two side plates 10 and 11. A pole mount 14 for mounting the reel on a fishing pole is provided on the lower part of the reel body 12.

The spool spindle 2 is rotatably mounted on the side plates 10 and 11 of the reel main unit 1 employing a pair of left and right bearings 31a and 31b that are disposed on either end thereof. In addition, two bearings 32a and 32b, which are disposed on either end of the spool 3 separated by a gap in the axial direction from the inner side of the bearings 31a and 31b, rotatably support the spool 3. A constituent element of the moving mechanism (described later) of the lever drag mechanism 7 contacts the right side of the outer race of the bearing 31b on the right end of the spool spindle 2. Moreover, a third gear (described later) of the rotation transmission mechanism 6 contacts the left side of the inner race. The reverse-rotation check mechanism 9 contacts the inner race of the right side bearing 31a on the left end of the spool spindle 2. In addition, the side plate 10 contacts the left end of the outer race. The spool 3 contacts the left side of the outer race of the spool-supporting right end of the bearing 32b through a heat-sensitive hydraulic drag mechanism 33. Moreover, a cone spring 34 contacts the right side of the inner race through a washer (not indicated in the diagram). This cone spring 34 is provided to enable adjusting drag force in a wide range without rapidly increasing the drag force in response to the swing of the brake manipulation lever (described later). A second disk plate, which will be described later with the lever drag mechanism 7, contacts the left side of the inner race of the spool-supporting left end of the bearing 32a. The right side of the outer race contacts the spool 3.

The spool 3 has a line-winding barrel 3a and flanges 3b that are formed integrally on either end of the line winding barrel 3a. A sounding ring, which circumferentially has multiple sound holes 35a for emitting sound when the drag operates, is provided on the end face of the flange 3b of the right side. A sounding pin 36 that is attached on the side plate 11 faces the sound holes 35a of this sound ring 35. This sounding pin 36 is urged on the protruding side. Moreover, this sound pin 36 is shiftable into an advance position and a retreat position using the lever 37 (FIG. 2), and normally, except when casting, the sound pin 36 is disposed in the advance position using the lever 37. For this reason, normally a clicking sound is emitted when the spool 3 rotates.

The handle 4 is secured to the protruding end of the cylindrical handle spindle 5 that is disposed below the spool spindle 2 and parallel to the spool spindle 2. The handle spindle 5 is rotatably supported by the reel main unit 1 on bearings 33a and 33b, which are disposed at an axial spacing below the boss 11a. The bearings 33a and 33b are mounted on either end of the inner peripheral face of a cylindrical member 15a that is set into the bearing block 15 below the boss 11a. As indicated in FIG. 3, a diametrically penetrating slit 5a is formed on the tip of the handle spindle 5, and female threads 5d are formed on the inner surface of the tip.

The rotation transmission mechanism 6 is provided with a high/low dual-speed switchable change-speed mechanism.

Figure 3:
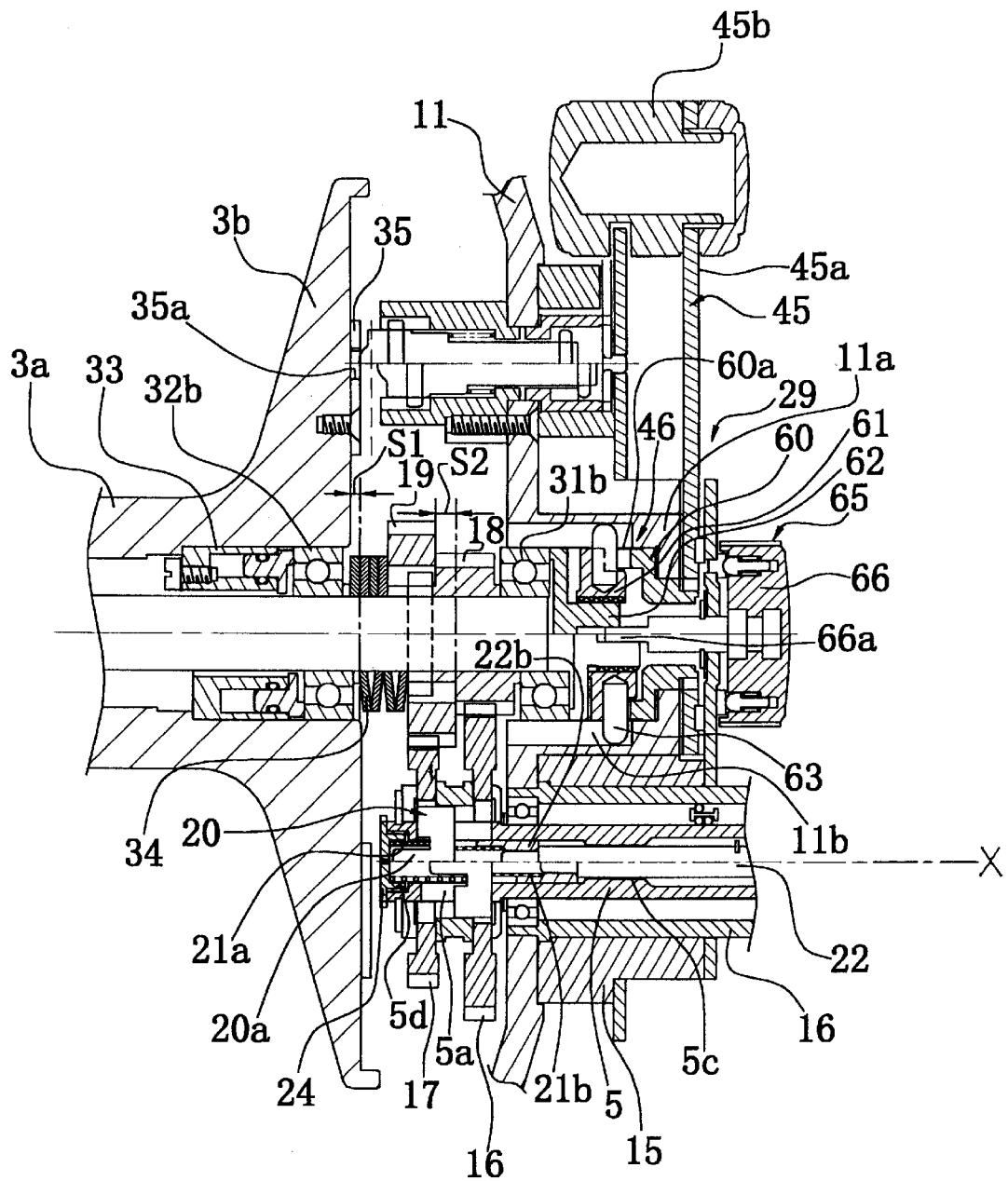
FIG. 3 is an enlarged cross-sectional, fragmentary view of the right end of the reel depicted in FIG. 1.

As indicated in FIG. 1 and 3, the rotation transmission mechanism 6 has a first gear 16 for high-speed winding and a second gear 17 for low-speed winding that are rotatably supported on the handle spindle 5 of the handle 4; a third gear 18 and a fourth gear 19 that are mounted non-rotatably on the spool spindle 2, meshed respectively with the gears 16 and 17; an engagement piece 20 that meshes one or the other of the first and second gears 16 and 17 with the handle spindle 5 to transmit rotation; two compression springs 21a and 21b on either side of the engagement piece 20 that position the engagement piece 20; and an operating spindle 22 that sets the position of the engagement piece 20.

The engagement piece 20 is disposed non-rotatably in the slit 5a in the handle spindle 5. A protruding part 20a is provided in the center of the engagement piece 20. The protruding part 20a is disposed on the inner circumferential side of a flange-shaped spring retainer 24 that receives the compression spring 21a. The spring retainer 24 is fastened by a screw to the tip of the handle spindle 5.

In the interior of the handle spindle 5, the operating spindle 22 passes through the handle spindle 5 and protrudes to the exterior. The operating spindle 22 is supported to be axially shiftable by means of a guide 5b that screws into the protruding end of the handle spindle 5 and a guide portion 5c that is formed midway along the inner circumferential surface of the handle spindle 5. A groove 22a is formed in the outward-protruding end of the operating spindle 22. A slide-type stopper 23 that is engaged in the groove 22a is provided in the handle 4. A spring retaining member 22b that receives the compression spring 21b is mounted on the opposite-side end of the operating spindle 22.

In the rotation transmission mechanism 6 thus configured, when the operating spindle 22 is pressed in, as is shown in FIG. 3 to the upper side of the operating spindle 22 axis X, the engagement piece 20 is disposed on the second gear 17. The rotation of the handle 4 is transmitted to the fourth gear 19 via the second gear 17, rotating the spool spindle 2 and the spool 3 at low speed. On the other hand, when the slide-type stopper 23 is slid and the operating spindle 22 is drawn out as is indicated in FIG. 3 to the lower side of the operating spindle axis X, the engagement piece 20 is disposed on the first gear 16. The rotation of the handle 4 is transmitted to the third gear 18 via the first gear 16, rotating the spool spindle 2 and the spool 3 at high speed.

As indicated in FIG. 1, the lever drag mechanism 7 has a brake disk 25 that is mounted on the left end of the spool 3 in FIG. 1; a pair of friction disks 26 and 27 that are disposed on either side of the brake disk 25; a coil spring 28 (FIG. 5) that is the urging means to urge the brake disk 25 through the spool 3 in the direction moving it away from the friction disk 27; and a shifting mechanism 29 for reciprocally shifting the spool 3 and the friction disk 27 in the spool axial direction.

Figure 4:
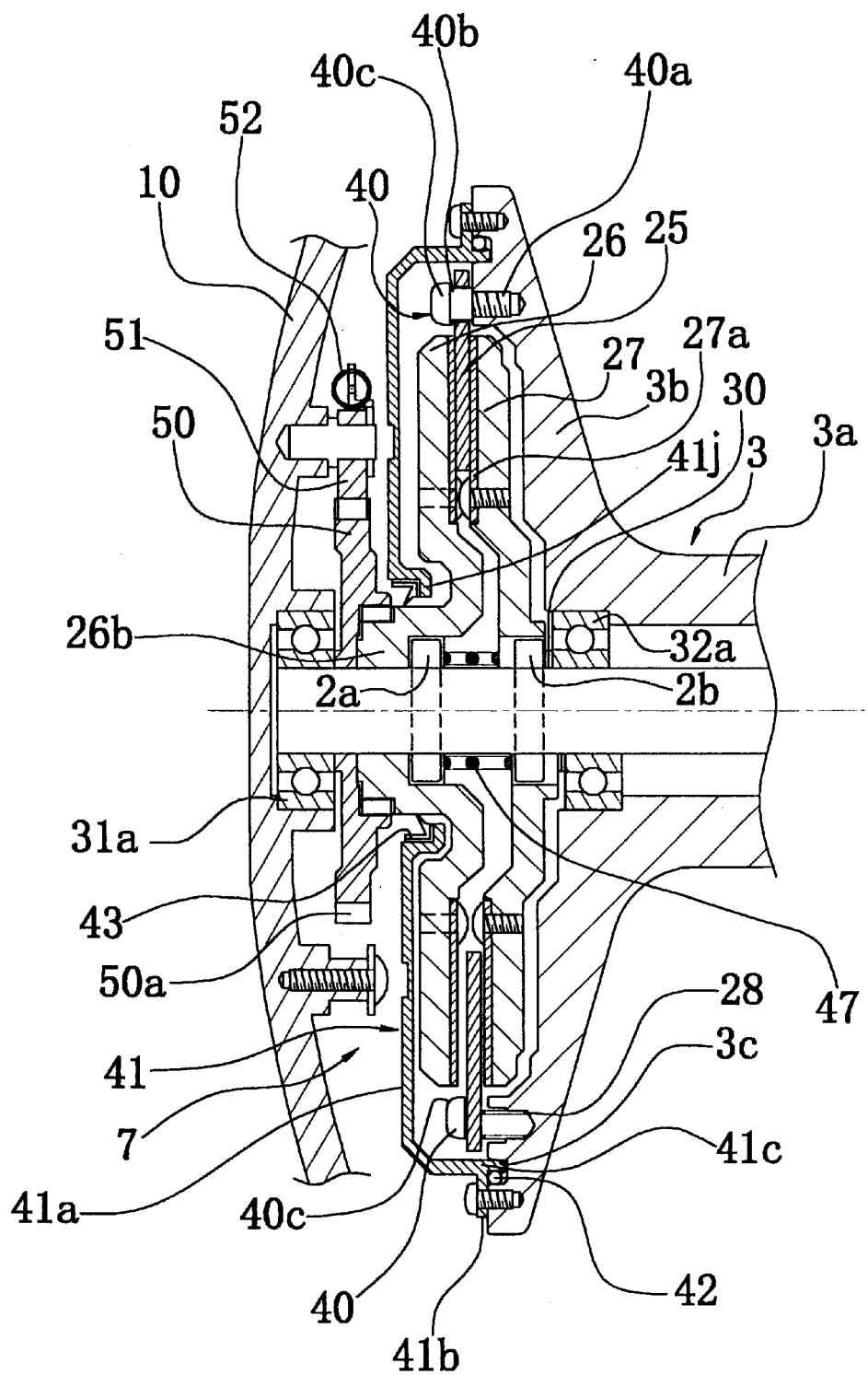
FIG. 4 is an enlarged cross-sectional, fragmentary view of the left end of the reel depicted in FIG. 1.

As indicated in FIG. 4, the brake disk 25 is a washer-shaped disk member made of, for example, stainless steel, and is mounted on the end surface of the flange 3b of the left side of the spool 3 to move freely a predetermined distance in the direction breaking away from the spool 3, and non-rotatably in relation to the spool 3, employing a plurality of circumferentially spaced mounting pins 40. The mounting pins 40 have a threaded part 40a that screws into the end surface of the flange 3b, a guide part 40b with a diameter larger than that of the threaded part 40a, and a head part 40c with a diameter larger than the guide part 40b. The brake disk 25 is shiftable axially fitted on the guide parts 40b of the mounting pins 40, shiftable a predetermined distance wherein its own thickness is subtracted from the axial length of the guide part 40b. The assembly pins 40 serve as both a rotation stop component and a restricting component for the brake disk 25. The brake disk 25 is urged by the coil spring 28 in the brake-released state, wherein it is positioned such that it contacts the head parts 40c. In FIG. 3 and FIG. 4, the braked state is depicted above the spool spindle axis, and the brake-released state is depicted below.

The friction disk 26 is disposed facing the surface of the side of the brake disk 25 away from the spool 3. A ring-shaped friction plate 26a (FIG. 5) made of an abrasion-resistant material, such as, for example, carbon graphite and fiber-reinforced synthetic polymer, is fixed to the surface of the friction disk 26 that faces the brake disk 25 using a suitable fixing means such as a machine screw. In the center of the friction disk 26 is an axially protruding cylindrical boss 26b. A pin 2a interlocks with the boss 26b, fitted to the spool spindle 2 wherein it pierces the spool spindle 2 diametrically. Accordingly, the friction disk 26 is fitted non-rotatably on the spool spindle 2, wherein it rotates together with the spool spindle 2. Moreover, a ratchet wheel 50 of the reverse-rotation check mechanism 9 contacts the left end in FIG. 4 of the boss 26b of the friction disk 26. The ratchet wheel 50 is mounted non-notatably on the peripheral surface of the boss 26b using a suitable stop means, for example, serration. The ratchet wheel 50 contacts the inner race of the bearing 31a. Moreover, the outer race of the bearing 31a contacts the side plate 10 as previously described. As a result, the friction disk 26 is immobile axially outward of the spool (to the left in FIG. 4), specifically, in the direction that moves away from the brake disk 25, and rotation in the line spool-out direction is prevented by means of the ratchet wheel 50.

The reverse-rotation check mechanism 9, furthermore, is a pawl system that has the ratchet wheel 50 with teeth 50a formed on the peripheral surface, and a ratchet claw 51 disposed on the periphery of the ratchet wheel 50 and the end of which stops the teeth 50a. The ratchet claw 51 is pivotably fitted to the inner surface of the side plate 10, and is urged into engagement with the teeth 50a by a tension spring.

The friction disk 27 is disposed facing the surface of the spool 3 side of the brake disk 25, and is fitted to the spool spindle 2 to be shiftable in the spool axial direction for rotating by connecting with the friction disk 26 and breaking contact with the friction disk 26. A ring-shaped friction plate 27a made of anti-abrasive material such as, for example, carbon graphite and fiber-reinforced synthetic polymer, is fixed by screws to the surface of the friction disk 27 facing the brake disk 25. The friction disk 27 is non-rotatably fitted to the spool spindle 2 in the center by means of a pin 2b fitted to the spool spindle 2 wherein it pierces the spool spindle 2 diametrically. Further, the inner race of the bearing 32a contacts the right end surface in FIG. 4 of the friction disk 27 through a washer 30. Consequently, the friction disk 27 both is pressed by the spool 3 and presses on the spool 3 through the bearing 32a.

Figure 5:
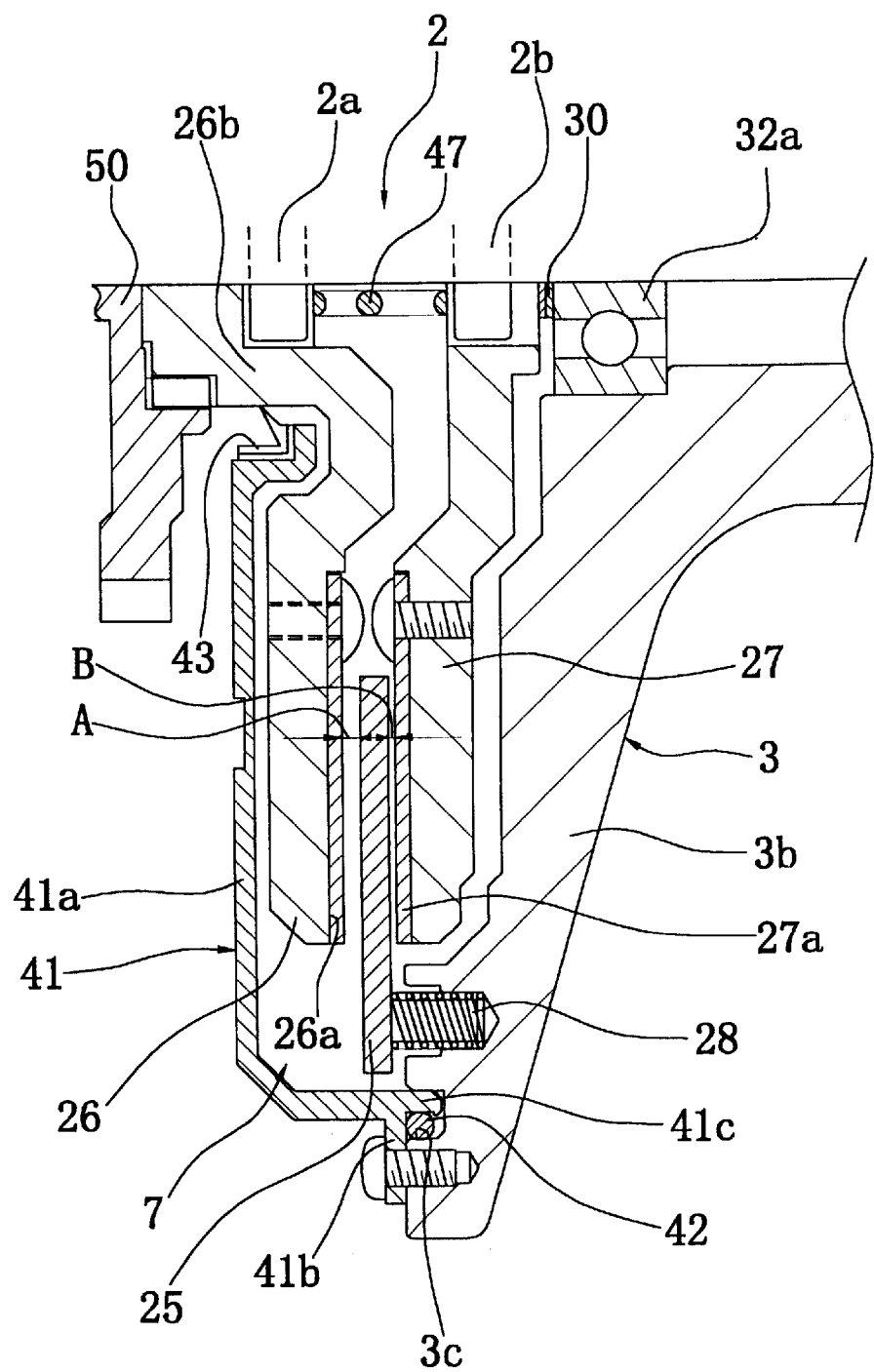
FIG. 5 is a partial cross-sectional view of the lever drag mechanism, further enlarged over and corresponding to FIG. 4.
Figure 7:
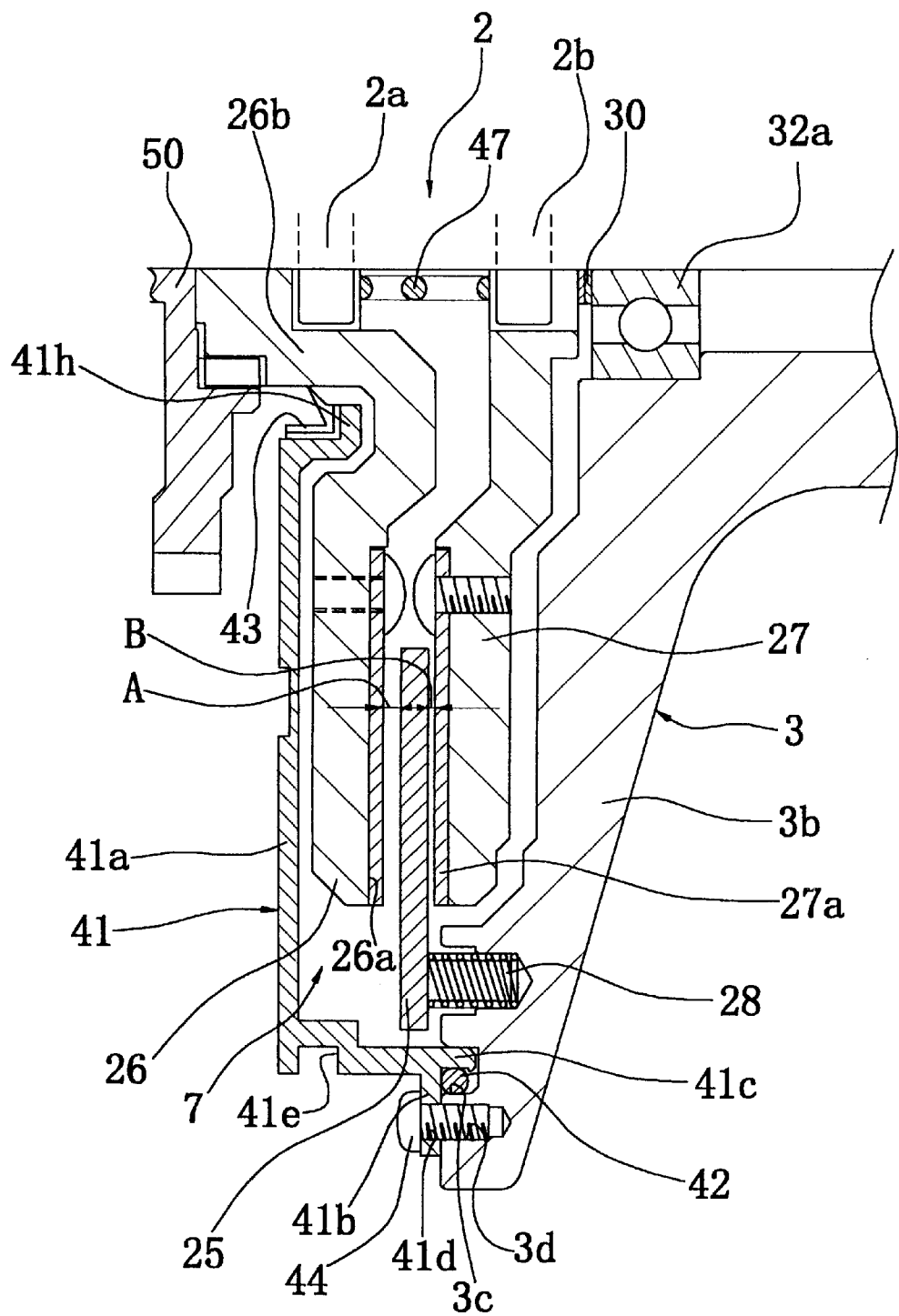
FIG. 7 is a partial cross-sectional view of the lever drag mechanism, further enlarged over and corresponding to FIG. 6.

Here, as indicated in FIG. 5 and 7, when in the brake released state, the gap A between the friction plate 26a of the friction disk 26 and the brake disk 25 is greater than the gap B between the friction plate 27a of the friction disk 27 and the brake disk 25. The reason for this will be explained in the brake operation to be described later.

The outside of the friction disk 26 is covered by a drag cover 41 that is mounted on the side face of the spool 3. The drag cover 41 is made of, for example, an aluminum alloy taking heat-dissipating performance into consideration. The drag cover 41 has a disk-shaped cover main body 41a having a circular aperture in the center, and a ring-shaped mounting portion 41b that is formed integrally on the outer circumferential surface of the cover main body 41a. The cover main body 41a has room interiorly to accommodate the friction disks 26, 27 and the brake disk 25.

Figure 6:
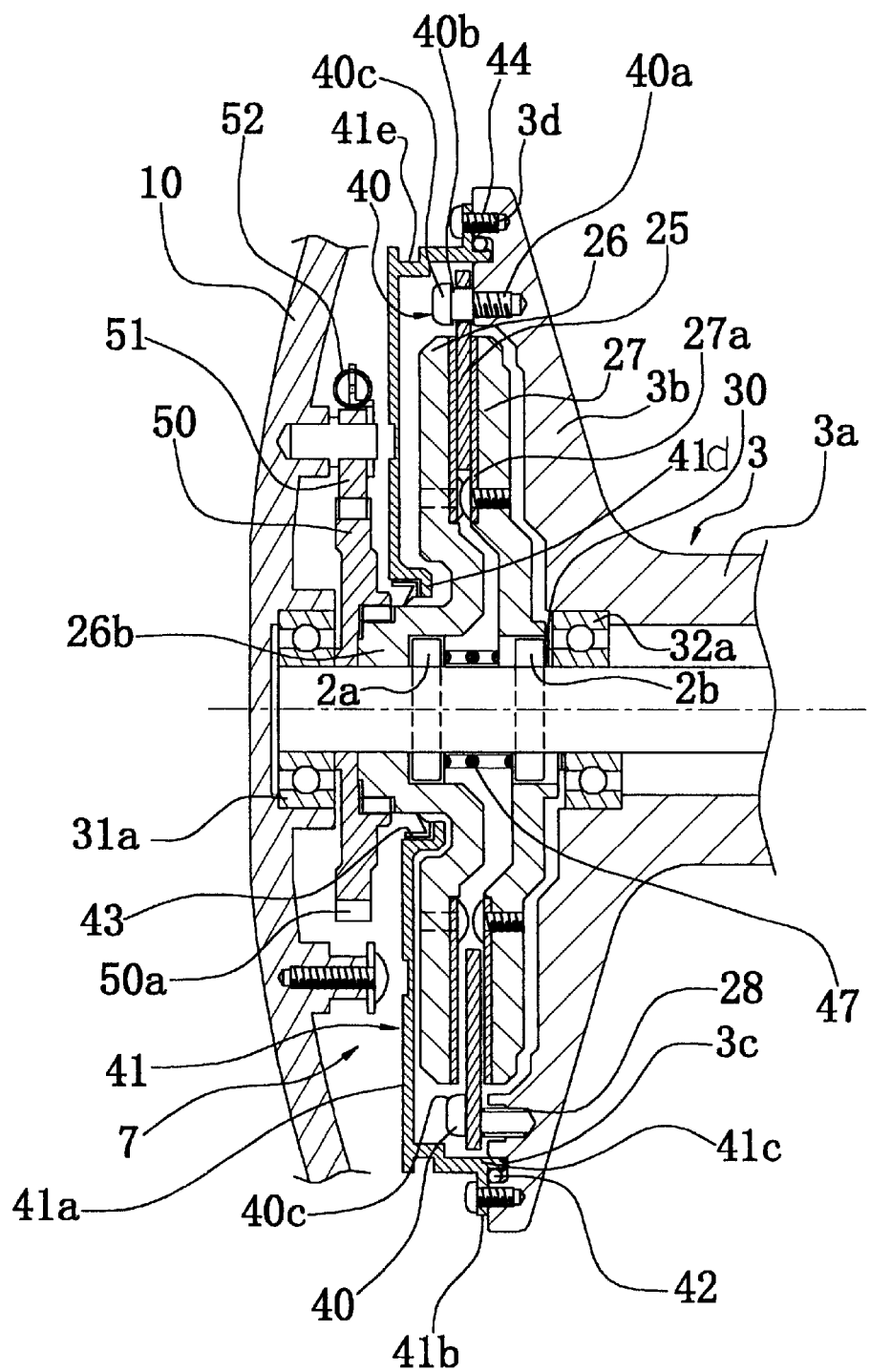
FIG. 6 is view corresponding to FIG. 4, but illustrating different conformational features of the drag cover attachment.

Referring now to FIG. 6 and 7, the drag cover 41 is fixed to the end face of the flange 3b by a plurality of suitable fixing means such as machine screws 44. A plurality of circumferentially spaced screw through-holes 41d is formed on the mounting portion 41b. Corresponding to the screw through-holes 41d, circumferentially spaced female-threaded holes 3d are formed in the end face of the spool 3 left-end flange 3b. Inserting the machine screws 44 into the screw through-holes 41d and screwing them into the female-threaded holes 3d fastens the drag cover 41 to the end face of the flange 3b. It is thus easier to manage the tightening torque compared to the instance in which fastening is by screwing the entire body into the spool, facilitating assembly.

A cylindrical centering portion 41c is provided on the assembly part 41b, protruding toward the spool 3 from its end face on the spool side. A circular groove 3c with a rectangular cross-section is formed on the end face of the flange 3b on the left side of the spool 3, and the centering portion 41c fits into the circular groove 3c.

The centering portion 41c has an inner peripheral surface that closely fits with the side wall of the inner peripheral side of the circular groove 3c. By mating the centering portion 41c into the circular groove 3c, the spool 3 and the drag cover 41 are centered on the inner peripheral surface of the centering portion 41c. An O-ring 42, which contacts the wall surface of the outer peripheral side of the circular groove 3c, is mounted on the outer peripheral surface of the centering portion 41c, and prevents intrusion of liquid from the outside.

Also provided is a seal part 41j on the inner circumferential surface of the cover main body 41a, protruding toward the friction disk 26 side. A lipped seal member 43 is mounted on the seal part 41j. The edge of the lip of this seal member 43 contacts the outer circumferential surface of the boss 26b of the friction disk 26. Accordingly, the intrusion of liquids from the outside is prevented. The drag cover 41 and the spool 3, as well as the drag cover 41 and the friction disk 26, are sealed by the O-ring 42 and the seal member 43. The interior of the drag cover 41, in which the brake disk 25 and the friction disks 26 and 27 are disposed, has a waterproof seal. By combining the O-ring 42 and the seal member 43 in this way, a highly reliable drag waterproof structure is obtained. In addition, an O-ring assembly groove may be provided for the seal part 41c in order to facilitate fitting on the O-ring 42.

Moreover, the drag cover 41 and the spool 3 are centered, and the friction disk 26 is mounted on the spool spindle 2 and is concentric with the spool 3. Therefore, the drag cover 41 and the friction disk 26 are disposed concentrically, the lip of the seal member 43 makes even contact with the boss 26b of the friction disk 26, and the seal performance is improved.

A removal groove 41e, which is formed in a circular shape, is formed on the outer peripheral surface of the cover main unit 41a. The removal groove 41e is provided to facilitate pulling off with a tool or finger when removing the drag cover 41, wherein the centering portion 41c is tightly fitted to the circular groove 3c and is difficult to remove.

When assembling the drag cover 41 on the spool 3, the O-ring 42 is first mounted on the outer peripheral surface of the centering portion 41c provided on the drag cover 41, and the centering portion 41c is fit into the circular groove 3c in this state. Therein, the screw through-holes 41d are fit on to face the female screw holes 3d. Thus, the drag cover 41 is centered on the spool 3 by tightly fitting the inner peripheral surface of the centering portion 41c on the wall surface of the inner peripheral side of the circular groove 3c. The intrusion of liquids from the drag cover 41 into the interior space is prevented by the O-ring 42 making contact with the outer peripheral surface of the centering portion 41c and the wall surface of the outer peripheral side of the circular groove 3c. Then, the machine screws 44 are passed through the screw through-holes 41d and are screwed into the female screw holes 3d. Accordingly, the assembly of the drag cover 41 onto the spool 3 is complete.

Here, because the centering portion 41c is tightly fit into the circular groove 3c, the drag cover 41 is centered concentrically with the spool 3 just by assembling the drag cover 41. Moreover, because the drag cover 41 is assembled using a plurality of machine screws 44, it is easy to control the tightening torque. For this reason, the drag cover 41 can be precisely and easily assembled on the spool 3. In addition, because the drag cover 41 is assembled using the machine screws 44, it is no longer necessary to form a thick threaded portion on the outer peripheral end of the drag cover 41 and the flange 3b, curbing any necessary increase in spool 3 inertia.

Figure 2:
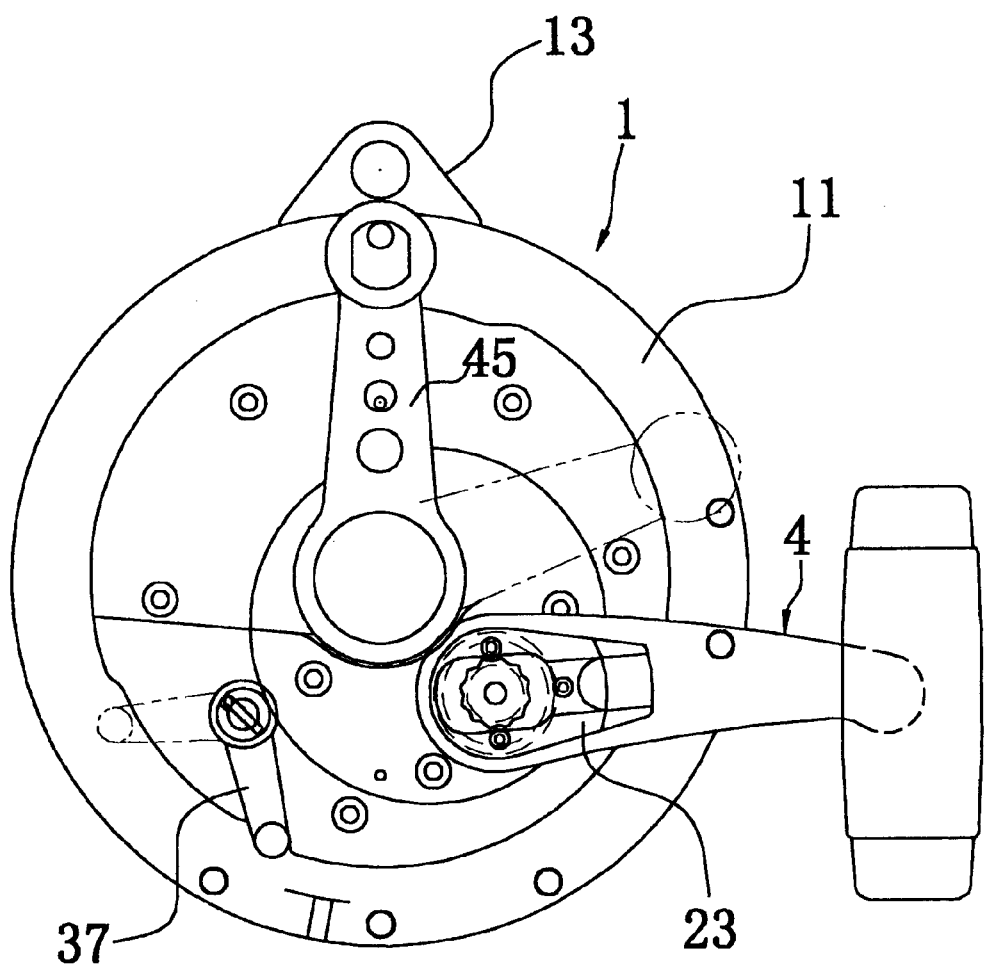
FIG. 2 is a side-view diagram of the reel depicted in FIG. 1.

As indicated in FIGS. 2 through 4, the shifting mechanism 29 has a brake operation lever 45 provided to freely swing on the reel main unit 1, a pressing mechanism 46 that presses the spool 3 and said friction disk 27 in response to the swing of the brake manipulation member in the clockwise direction of FIG. 2 and causes them to move to the left in FIG. 3, and a return spring 47 for urging the friction disk 27 and causing the spool and the friction disk 27 to move to the right in FIG. 3 in response to the movement of the brake manipulation lever 45 counterclockwise in FIG. 2.

The return spring 47 is mounted in a compressed state on the outer periphery of the spool spindle 2 between the two friction disks 26 and 27, and urges the two friction disks 26 and 27 in the direction such that they move apart. The return spring 47 urges the friction disk 27 and the spool 3 to the right in FIG. 4.

The brake manipulation lever 45 is mounted to freely swing on the reel main unit 1 between the brake release position indicated by the solid line in FIG. 2 and the maximum brake position indicated by the dotted line. The brake manipulation lever 45 has a lever portion 45a that is mounted to freely swing on the boss 11a, and a knob 45b that is secured to the tip of the lever portion 45a. The base end of the lever portion 45a is stopped non-rotatably by a first cam member 60 that constitutes the pressing mechanism 46.

The pressing mechanism 46 is provided with the first cam member 60, rotatably fitted to the inner peripheral surface of the boss 11a and not axially shiftable; a second cam member 61 that is axially shiftable by the rotation of the first cam member 60; a pressing member 62 that links with the second cam member 61 and is axially shiftable; and a pressing force adjustment mechanism 65 for adjusting the pressing force caused by the pressing member 62.

The first cam member 60 is a cylindrical element having large and small stages that rotate by linking to the swing of the brake manipulation lever 45. The base end of the lever part 45a of the brake manipulation lever 45 is stopped on the outer peripheral surface of the tip side (left side in FIG. 3) of the small diameter of the first cam member 60 by using a suitable stop means such as serration. A slanted cam 60*a* is formed on the end surface of the base end side of the large diameter.

The second cam member 61 is a cylindrical element, and is fitted non-rotatably but axially shiftable on the inner peripheral surface of the boss 11*a*. A slanted cam 61*a* that meshes with the slanted cam 60*a* is formed on the end surface on the outer peripheral side of the second cam member 61 facing the first cam member 60. Through the relative rotation of these two slanted cam members 60*a* and 61*a*, the rotational movement of the first cam member 60 is converted into linear movement in the axial direction of the second cam member 61, and the second cam member 61 moves axially. Two stop pins 63 that protrude in the radial direction are set up on the second cam member 61. The tips of the stop pins 63 are stopped by a stop groove 11*b* that is formed along the axial direction on the inner peripheral surface of the boss 11*a*, and the second cam member 61 is stopped non-rotatably on the boss 11*a*. The inner peripheral surface of the second cam member 61 screws into the pressing member 62. In this manner, the relative positional relationship in the axial direction of the second cam member 61 and the pressing member 62 can be adjusted, and the drag force can be adjusted at a predetermined position of the brake manipulation lever 45.

The pressing member 62 is a cylindrical member with a brim, and the outer peripheral surface of the cylindrical part screws into the second cam member 61. Moreover, the end surface of the brim part on the left in FIG. 3 protrudes slightly, and this protruding part touches the outer ring of the bearing 32*b*.

The pressing force adjustment mechanism 65 has an adjustment knob 66 wherein a tip 66*a* is stopped non-rotatably in the central part of the pressing member 62 and is able to move in the axial direction. The adjustment knob 66 is mounted rotatably around the spool spindle core on the reel main unit 1 and is configured such that a clicking sound is generated by rotation. When the adjustment knob 66 is rotated, the pressing member 62 rotates, and the relative axial positions of the pressing member 62 and the second cam member 61 which screws into the pressing member 62 change. Accordingly, the drag force can be adjusted when the brake manipulation lever 45 is in a predetermined position.

Note that, in FIG. 3, indicated below the spool spindle axis is the state wherein the pressing force is adjusted to the minimum by allowing the pressing member 62 to come into contact with the second cam member 61; and indicated above is the state wherein the pressing force is adjusted to the maximum by moving the pressing member 62 and the second cam member 61 furthest apart.

Next, the brake operation of the lever drag mechanism 7 will be explained.

In the lever drag mechanism 7, when the brake manipulation lever 45 is swung from the brake position indicated by the phantom lines in FIG. 2 to the brake release position indicated by the solid lines, the mechanism changes from the state indicated above the spool spindle core in FIG. 3 and 4 to the state indicated below. First, the friction disk 27 is pressed by the urging force of the return spring 47, and moves to the left side in FIG. 4. When the friction disk 27 moves, the brake disk 25 is urged by the coil spring 28 in the direction moving away from the spool 3 (the direction moving away from the friction disk 27), and therefore the brake disk 25 is maintained in a state wherein pressure contact is made with the friction disk 26, the friction disk 27 moves away from the brake disk 25, forcing a gap between the brake disk 25 and the friction disk 27. Further, the spool 3 is pressed through the bearing 32*a* and moves to the right side. Then, when the spool 3 moves a predetermined distance, the brake disk 25 is stopped by the head part 40*c* of the assembly pin 40, and moves together with the spool 3 to the right side in FIG. 4. As a result, the brake disk 25 moves away from the friction disk 26, forcing a gap between the brake disk 25 and the friction disk 26. Accordingly, the braking of the spool 3 is released. Meanwhile, when the spool 3 moves, the second cam member 61 and the pressing member 62 retreat to the right side in FIG. 3 by being pressed through the heat-sensitive hydraulic drag mechanism 33, the bearing 32*b*, the disk spring 34, the third and fourth gears 18 and 19, and the bearing 31*b*. Then, when the brake manipulation lever 45 is swung to the brake release position, it enters the state illustrated below the spool spindle axis in FIG. 3 and 4, and the members on the left side from the disk spring 34 including the spool 3 shift just the distance S1. Moreover, the members on the right side from the disk spring 34 including the third and fourth gears 18 and 19 shift just the distance S2. Then, the two friction disks 26 and 27 move completely apart from the brake disk 25. Therein, the gap A between the friction disk 26 and the brake disk 25 is larger than the gap B between the friction disk 27 and the brake disk 25 as previously described, and therefore during brake release, the distance after the brake disk 25 moves away from the friction disk 26 is made longer, securing a wider range for the brake release state.

Meanwhile, when sliding the brake manipulation lever 45 from the brake release position indicated by the solid line in FIG. 2 to the brake position indicated by the two dotted lines, the status changes from the state indicated below the spool spindle core in FIGS. 3 and 4 to the state indicated above. First, the first cam member 60 is rotated by swinging the brake manipulation lever 45, and the second cam member 61 moves to the left in the spool axial direction. By linkage to this, the pressing member 62 applies pressure to and shifts the outer race of the bearing 31*b*, and the spool 3 is pressed and shifts to the left in the spool axial direction (the left in FIG. 1) through the third and fourth gears, the disk spring 34, the bearing 32*b*, and the heat-sensitive hydraulic drag mechanism 33. As a result, the brake disk 25, which is urged by the coil spring 28, moves to the left in the axial direction. Meanwhile, the friction disk 27 is also pressed and moves to the left in the axial direction through the spool 3 and the bearing 32*a*. As a result, the brake disk 25 and the friction disk 27 approach the friction disk 26. Then, when the brake disk 25 contacts the friction disk 26, which cannot move in the axial direction and which cannot rotate in the line spool-out direction, a slight drag force acts on the spool 3. Then, when the spool 3 is further pressed, the spool 3 approaches the brake disk 25 which has contacted the friction disk 26, and the brake disk 25 and the friction disk 27 make contact. Then, when the brake manipulation lever 45 is swung to the maximum brake position, the pressing force becomes the maximum, and the brake disk 25 is held between the two friction disks 26 and 27, and a large drag force is obtained. Therein, because the gap A between the friction disk 26 and the brake disk 25 is larger than the gap B between the friction disk 27 and the brake disk 25 as previously described, during braking, when the brake disk 25 makes contact with the friction disk 26, the friction disk 27 immediately contacts the brake disk 25, which heightens the drag force sensitivity and effectiveness. Specifically, the time (distance) after the friction disk 26 has made contact with the damping disk 25 (and as the damping disk 25 approaches the spool 3 by resisting the urging force of the coil spring 28) up to when the friction disk 27 makes contact with the damping disk 25 is shortened, and the time during which the damping disk 25 is in contact only with the friction disk 26 is reduced, which effectively increases the drag force.

Next, the method of operating the trolling reel will be explained.

The operating spindle 22 is drawn out when using the rotation transmission mechanism 6 for high-speed winding. In this manner, the engagement piece 20 meshes with the first gear 16 by the urging force of the compression spring 21a. As a result, the rotation of the handle 4 is transmitted to the spool 3 through the handle spindle 5, the first gear 16, the third gear 18, the spool spindle 2, and the lever drag mechanism 7, and the spool 3 rotates at high speed.

Meanwhile, the operating spindle 22 is pressed in during slow-speed winding. In this manner, the engagement piece 20 meshes with the second gear 17 by the urging force of the compression spring 21b. As a result, the rotation of the handle 4 is transmitted to the spool 3 through the handle spindle 5, second gear 17, fourth gear 19, the spool spindle 2, and the lever drag mechanism 7, and the spool 3 rotates at low speed. In addition, when the operating spindle 22 has been pressed in, if the slide-type stopper 23 meshes with the groove 22a, the state with the operating spindle 22 pushed in is maintained.

Moreover, when the pressing force at a predetermined swing position of brake manipulation lever 45 of the lever drag mechanism 7 is to be adjusted, the relative positions in the axial direction of the pressing member 62 and the second cam member 61 are modified by the adjustment knob 66. For example, when both are made to approach each other by rotating the adjustment knob 66 counterclockwise in FIG. 2, the pressing force drops because the spool 3 moves in the direction away from the friction disk 26. Conversely, when the two are made to move apart by rotating the adjusting knob 66 clockwise in FIG. 2, the pressing force increases because the spool 3 moves in the direction approaching the friction disk 26.

When adjusting the drag force using the brake manipulation lever 45, if the brake manipulation lever 45 is gradually swung from the brake release position to the maximum brake position, the second cam member 61 moves to the left in FIG. 3, the pressing force of pressing member 62 is transmitted through the members on the periphery of the spool spindle 2, for example the bearing 31b, the spool 3 and the friction disk 27 move, and the force of friction between the brake disk 25 and the two friction disks 26 and 27 gradually becomes larger. The drag force can be adjusted by doing this. Then, when catching a fish, the spool 3, wherein the reverse rotation is restricted by the reverse-rotation check mechanism 9 through the lever drag mechanism 7, rotates in reverse through the pull of the fish, and the drag force that is set by the lever drag mechanism 7 acts on the spool 3.

OTHER EMBODIMENTS (a) The position for mounting the drag cover 41 is not limited to the end surface of the side of the spool 3 away from the handle 4, and is determined by the mounting position of the lever drag mechanism 7. Specifically, if the lever drag mechanism is on the handle 4 side, the drag cover 41 is mounted on the handle 4 side of the spool 3.

(b) The rotating part is not limited to the spool 3 itself, and includes, for example, the case member, etc. that is provided on the spool spindle 2 such that it rotates as a single unit with the spool 3. The structure wherein the drag cover is assembled on this case member is also included in the present invention.

Figure 8:
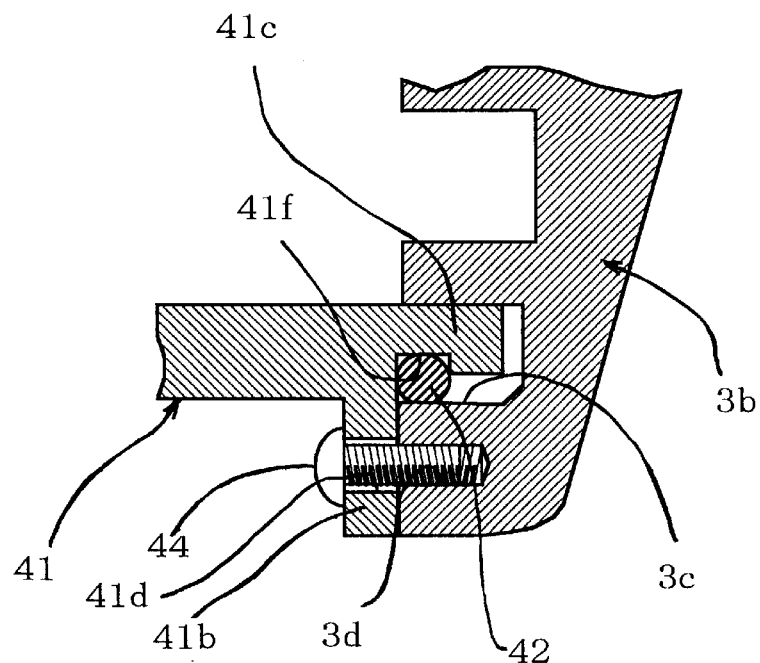
FIGS. 8–13 are enlarged fragmentary sectional views illustrating different conformational features of the drag cover attachment in corresponding further embodiments of the present invention.

(c) As indicated in FIG. 8, in order to make it easy to mount the O-ring 42, a ring-shaped mounting groove 41f that can stop the O-ring 42 on the centering portion 41c may also be provided. When providing this kind of mounting groove 41f, it is difficult for the O-ring 42 to move, and therefore the assembly operation for the drag cover 41 becomes easier.

Figure 9:
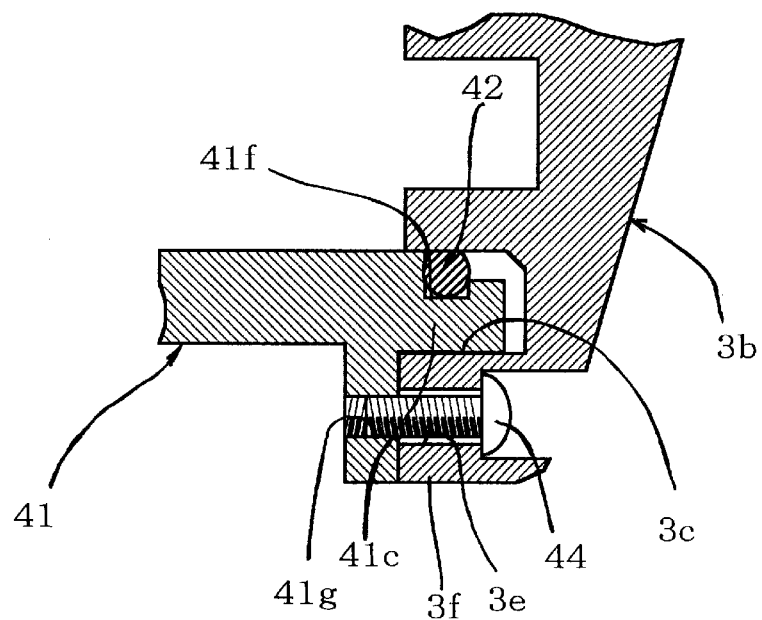

(d) In the above embodiment, the inner peripheral surface of the centering portion 41c and the wall surface of the inner peripheral side of the circular groove 3c were made to tightly fit, but the reverse is also acceptable, as indicated in FIG. 9. Specifically, in FIG. 9, the outer peripheral surface of the centering portion 41c and the wall surface of the outer peripheral side of the circular groove 3c are tightly fit together. Consequently, the O-ring 42 is mounted on the inner peripheral side of the centering portion 41c.

(e) In the above embodiment, the female screw holes 3d are formed on the flange 3b of the spool 3, and the assembly part 41b that has the screw through-holes 41d is formed on the drag cover 41, but the reverse is also acceptable as in FIG. 9. Specifically, in FIG. 9 the female screw holes 41g are formed on the drag cover 41, and the assembly part 3f that has the screw through-holes 3e is formed on the flange 3b.

Figure 10:
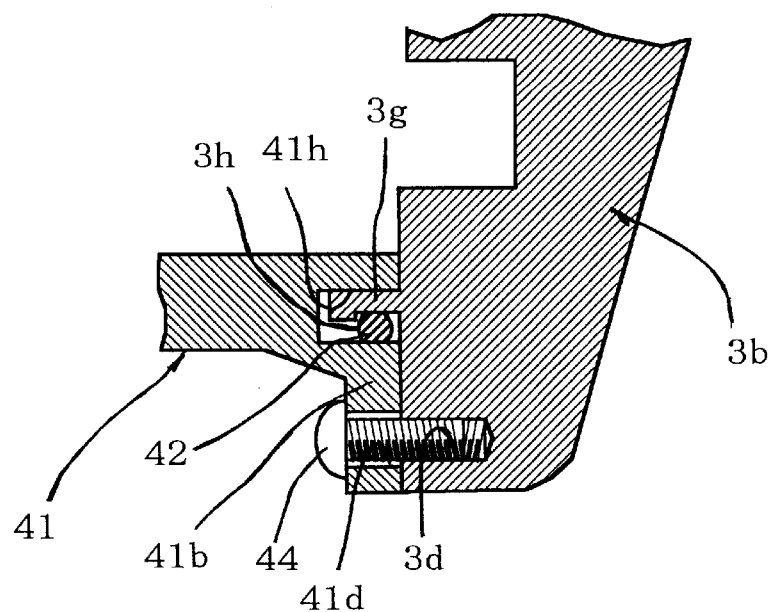

(f) In the above embodiment, the circular groove 3c is formed on the flange part 3b of the spool 3, and the centering portion 41c is formed on the drag cover 41, but the reverse is also acceptable as in FIG. 10. Specifically, in FIG. 10, the circular groove 41h is formed on the drag cover 41, and the centering portion 3g is formed on the flange part 3b. The mounting groove 3h of the O-ring 42 is also formed on the outer peripheral surface of this centering portion 3g.

Figure 11:
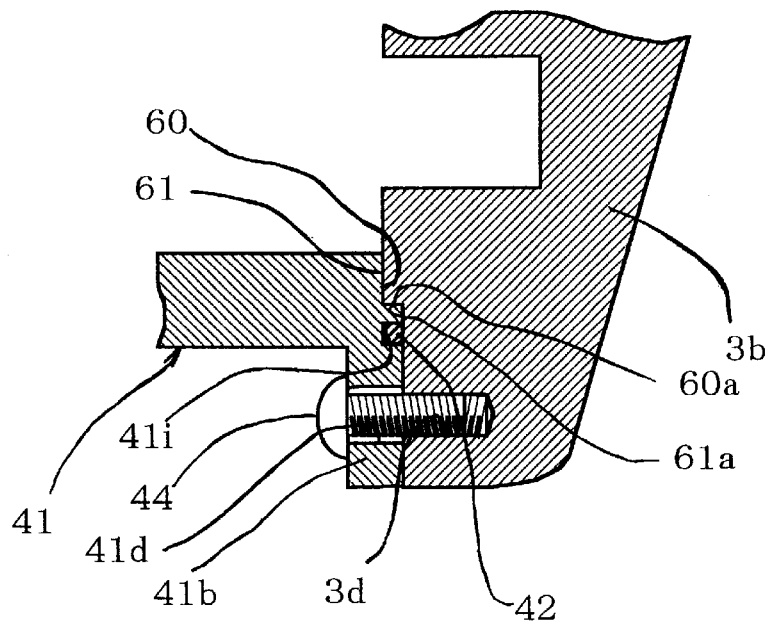
Figure 12:
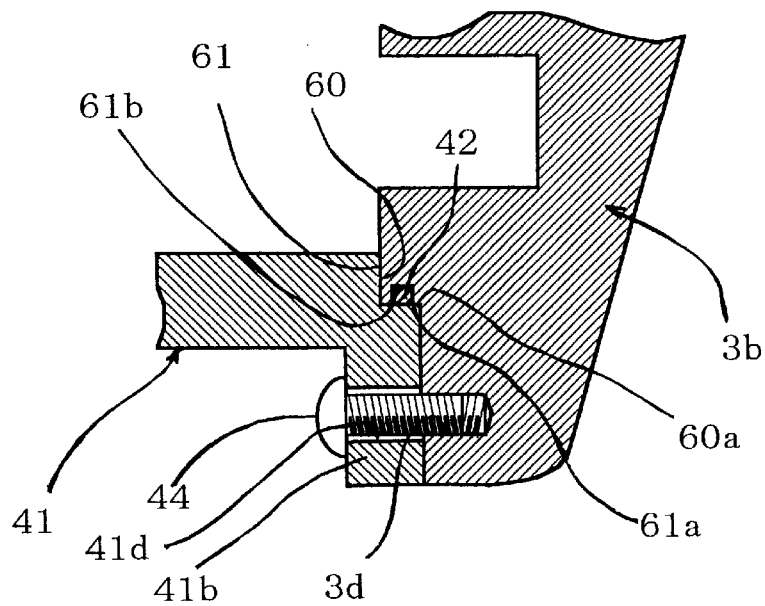
Figure 13:
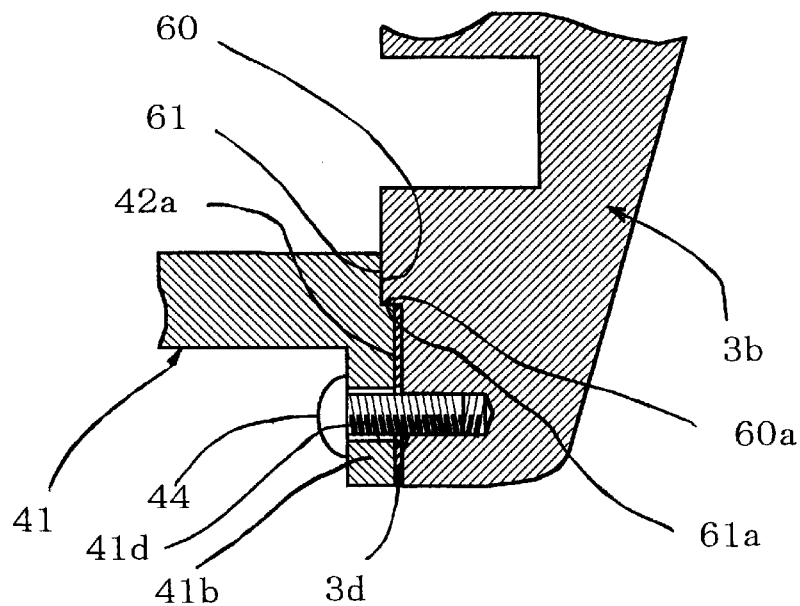

(g) In the above embodiment, centering is conducted by the circular groove 3c or 41h, and the seal is mounted inside the circular groove, but, as indicated in FIG. 11 through 13, it is also acceptable to provide a circular concave part 60 and a circular convex part 61 for a spigot joint on the drag cover 41 (or flange part 3b) and the flange part 3b (or drag cover 41), and to center the drag cover 41 and the flange part 3b using an inner peripheral surface 60a of the circular concave part 60 and an outer peripheral surface 61a of the circular convex part 61. In this case, in the embodiment indicated in FIG. 11, the O-ring 42 is mounted as a seal member on a seal groove 41i, which is formed on the outer peripheral side of the inner peripheral surface 60a. In addition, in the embodiment indicated in FIG. 12, the O-ring 42 is mounted on a seal groove 61b, which is formed on the outer peripheral surface 61a. Further, in the embodiment indicated in FIG. 13, a commercial pipe flange full surface form gasket 42a, which is a disk-shaped ring member, is mounted as a seal member between the drag cover 41 and the flange 3b on the outer peripheral side of the inner peripheral surface 60a.

(g) The configuration of the shifting mechanism 29 is not limited to a cam, and a screw or other mobile means may be used. Also, the brake manipulation member is not limited to a slide lever, and it may be a linear movement device or a rotational device.

(h) In the above embodiments, the O-ring 42 and a full surface form gasket are used as the seal member, but the seal member is not limited to an O-ring or a full surface form gasket, and oil seals with lips and other forms of gaskets, etc. are also included in the seal member.

According to the dual-bearing reel brake device in connection with the present invention, the first urging means urges the brake disk member in the direction moving away from the second disk member, and the brake disk member is mounted on the spool to move freely for a predetermined distance. Therefore, the behavior of the brake disk member in the axial direction is stable, and reliably moves away from the second disk member. The timing wherein the brake release state is entered by the first disk member moving away from the brake disk member is the point in time that the spool has moved a predetermined distance, and the timing is fixed. For this reason, movement from the brake state to the brake release state can be executed reliably, and the brake release state can be reliably guaranteed.

Further in accordance with the present invention, because a centering means and a seal means are provided, the drag cover can be centered concentrically with the rotating member and the interior of the drag cover can be sealed just by assembling the drag cover. Moreover, because the drag cover is assembled with screw members, it is easy to control the tightening torque. For this reason, the drag cover can be precisely and easily assembled on rotating member. In addition, because the drag cover is assembled with screw members, it is no longer necessary to form thick screw parts on the outer peripheral part of the drag cover and the outer peripheral side of the rotating member, and the increase of spool inertia can be suppressed.

According to a further aspect of the present invention, because the centering part is tightly fitted to the circular groove part, the drag cover can be centered concentrically with the rotating member just by assembling the drag cover. In addition, because the drag cover is assembled with screw members, it is easy to control the tightening torque. For this reason, the drag cover can be precisely and easily assembled on the rotating member. In addition, because the drag cover is assembled with screw members, it is no longer necessary to form thick screw parts on the outer peripheral part of the drag cover and the outer peripheral side of the rotating member, and the increase of spool inertia can be suppressed.

Various details of the present invention may be changed without departing from its spirit nor its scope. Furthermore, the foregoing description of the embodiments according to the present invention is provided for illustration only, and not for limiting the invention as defined by the appended claims and their equivalents.

What is claimed is:

1. A dual-bearing fishing reel spool-braking device for use in a dual-bearing reel having a reel main body, a handle rotatably supported by the reel main body, and a spool fitted rotatably to the reel main unit, rotation generated by the handle being transmitted to the spool through a rotational transmission path, said dual-bearing reel braking device being provided in the rotational transmission path to brake the rotation of the spool in a line-out direction, said dual-bearing reel braking device comprising:

a brake disk non-rotatably mounted on one end of the spool with a gap therebetween, such that said brake disk is shiftable a predetermined distance axially along the spool;

a first disk member to which rotation from the handle is transmitted, said first disk member being disposed facing said brake disk on a side of said brake disk away from the spool, said first disk member being axially immobile at least in a direction away from said brake disk, said first disk member being unrotatable in a line-out direction relative to the reel main unit;

a second disk member disposed facing said brake disk on a side of said brake disk closer to the spool, said second disk member being axially shiftable so as to part away from said first disk member, said second disk member being rotatable when said first disk member and said second disk member sandwich said brake disk;

a first urging member for urging said brake disk axially away from said second disk member; and shifting means for reciprocatingly shifting the spool and said second disk member axially to enable said first and second disk members to sandwich said brake disk.

2. A dual-bearing reel braking device as set forth in claim 1, wherein said first and second disk members are non-rotatably fitted to a spool spindle centrally penetrating and rotatably supporting said spool.

3. A dual-bearing reel braking device as set forth in claim 1, wherein said shifting means includes:
a shiftable brake operation member provided on the reel main unit;
pressing means for pressing and thereby shifting the spool and said second disk member in a first axial direction to sandwich said brake disk and generate braking force in response to a movement of said brake operation member, the first axial direction being a direction approaching said first disk member; and
a second urging member for urging said second disk member and thereby shifting axially the spool and said second disk member in a second axial direction opposite the first axial direction to release said brake disk and stop generating the braking force in response to a second movement of said brake operation member, the second direction being a direction away from said first disk member.

4. A dual-bearing reel braking device as set forth in claim 3, wherein said second urging member urges both said second and first disk members, such that said second and first disk members part away.

5. A dual-bearing reel braking device as set forth in claim 3, wherein:

said brake operation member is fitted to the reel main unit to be pivotable about said spool spindle;
the spool is fitted rotatably on said spool spindle; and
said pressing means, in response to a pivoting of said brake operation member, shifts said spool in the first axial direction through a member disposed peripherally around said spool spindle, and presses said second disk in the first axial direction via the spool.

6. A dual-bearing reel braking device as set forth in claim 3, wherein when said shifting means shifts the spool and said second disk member in the second axial direction, said first disk member is separated from said brake disk by a gap larger than a gap by which said second disk member is separated from said brake disk.

7. A dual-bearing reel braking device as set forth in claim 1, wherein said brake disk is mounted on an end of the spool opposite an end to which the handle is attached.

8. A dual-bearing reel braking device as set forth in claim 1, wherein said brake disk is mounted non-rotatably on the spool employing a rotational stop member disposed radially outward said first and second disk members.

9. A dual-bearing reel braking device as set forth in claim 1, wherein said brake disk is restricted in axial movement beyond the predetermined distance by a restricting member that is disposed radially outward of said first and second disk members.

10. A dual-bearing reel braking device as set forth in claim 9, wherein
   said brake disk is mounted non-rotatably on the spool employing a rotational stop member disposed radially outward said first and second disk members, and said rotational stop member and said restricting member are the same member.

11. A dual-bearing reel drag-cover mounting configuration for use with a dual-bearing fishing reel spool and accommodating therein drag disks of the dual-bearing fishing reel, said drag-cover mounting configuration comprising:
   a rotating member rotating unitarily with the dual-bearing fishing reel spool;
   a drag cover attached to said rotating member at opposing faces of said rotating member and said drag cover, said rotating member and said drag cover defining a space for accommodating therein the drag disks of the dual-bearing fishing reel, one of said opposing faces having a plurality of circumferentially spaced female-threaded portions formed thereon, the other of said opposing faces having a plurality of circumferentially spaced screw insertion holes formed thereon;
   centering means having first circumferential faces provided on said opposing faces of said rotating member and of said drag cover for disposing said rotating member and said drag cover concentrically;
   seal means disposed contacting second circumferential faces of said rotating member and said drag cover, for preventing intrusion of liquids from outside into the space, said second circumferential faces being different from said first circumferential faces; and
   fixing means for fixing said drag cover to said rotary member, said fixing means being disposed radially outward relative to said centering means and including
      said plurality of circumferentially spaced female-threaded portions disposed proximate said seal means,
      said plurality of circumferentially spaced screw insertion holes formed complementarily to said female-threaded portions, and
      a plurality of screw components for screwing into said plurality of female-threaded portions through said screw insertion holes.

12. A drag-cover mounting configuration for use with a dual-bearing fishing reel spool and accommodating therein drag disks of the dual-bearing fishing reel, said drag-cover mounting configuration comprising:
   a rotating member rotating unitarily with the dual-bearing fishing reel spool;
   a drag cover attached to said rotating member at opposing faces of said rotating member and said drag cover, said rotating member and said drag cover defining a space for accommodating therein the drag disks of the dual-bearing fishing reel, one of said opposing faces having a plurality of circumferentially spaced female-threaded portions formed thereon, the other of said opposing faces having a plurality of circumferentially spaced screw insertion holes formed thereon;
   centering means provided on said opposing faces of said rotating member and of said drag cover for disposing said rotating member and said drag cover concentrically;
   seal means disposed contacting said rotating member and said drag cover, for preventing intrusion of liquids from outside into the space; and
   fixing means for fixing said drag cover to said rotary member, said fixing means being disposed radially outward relative to said centering means and including
      said plurality of circumferentially spaced female-threaded portions disposed proximate said seal means,
      said plurality of circumferentially spaced screw insertion holes formed complementarily to said female-threaded portions, and
      a plurality of screw components for screwing into said plurality of female-threaded portions through said screw insertion holes,
   said centering means including:
      an annular channel formed in one of said opposing faces and disposed concentrically with a rotational axis of said rotating member; and
      a tubular portion formed on the other of said opposing faces and protruding toward said annular channel, said tubular portion and said annular channel centering said drag cover relative to said rotary member; and
   said seal means is an annular elastic body disposed between circumferential surfaces of said annular channel and tubular portion.

13. A drag-cover mounting configuration as set forth in claim 12, wherein
   said rotating member is the spool itself.

14. A drag-cover mounting configuration as set forth in claim 12, wherein
   the drag disks protrude going axially from the inner peripheral side of the drag cover, and a waterproof seal is fitted between the drag cover and the protruding part of the drag disks.

15. A drag-cover mounting configuration for use with a dual-bearing fishing reel spool and accommodating therein drag disks of the dual-bearing fishing reel, said drag-cover mounting configuration comprising:
   a rotating member rotating unitarily with the dual-bearing fishing reel spool;
   a drag cover attached to said rotating member at opposing faces of said rotating member and said drag cover, said rotating member and said drag cover defining a space for accommodating therein the drag disks of the dual-bearing fishing reel, one of said opposing surfaces having a plurality of circumferentially spaced female-threaded portions formed thereon, the other of said opposing faces having a plurality of circumferentially spaced screw insertion holes formed thereon;
   centering means provided on said opposing faces of said rotating member and said drag cover for disposing said rotating member and said drag cover concentrically;
   seal means disposed contacting said rotating member and said drag cover, for preventing intrusion of liquids from outside into the space; and
   a plurality of screw components for screwing into said plurality of female-threaded portions through said screw insertion holes,
      said plurality of circumferentially spaced female-threaded portions being disposed proximate said seal means, and formed in one of said opposing faces;
      said plurality of circumferentially spaced screw insertion holes being formed complementarily to said female-threaded portions in the other of said opposing faces,
      said centering means having an annular step portion formed concentrically therewith on an outer circumferential surface of one of said opposing faces of said drag cover and said rotating member, and an annular recess formed on an inner circumferential surface of the other of said opposing faces, said annular step portion and said annular recess being in contact with each other.

16. A drag-cover mounting configuration as set forth in claim 15, wherein said seal means is an annular elastic body accommodated in an annular groove formed in one of the respective outer and inner circumferential surfaces of said annular step portion and said annular recess, for sealing contact with the other of the respective outer and inner circumferential surfaces.

17. A drag-cover mounting configuration as set forth in claim 15, wherein said seal means is an annular elastic body accommodated in an annular seal groove formed peripherally outward of said centering means in one of said opposing faces of said drag cover and said rotating member, said seal means providing a sealing contact with the other of said opposing faces.

18. A drag-cover mounting configuration as set forth in claim 15, wherein said seal means is a disk-shaped ring member sandwiched between said opposing faces of said drag cover and said rotating member.

19. A dual-bearing reel drag-cover mounting configuration for use with a dual-bearing fishing reel spool and accommodating therein drag disks of the dual-bearing fishing reel, said drag-cover mounting configuration comprising:

a rotating member rotating unitarily with the dual-bearing fishing reel spool;

a drag cover attached to said rotating member at opposing faces of said rotating member and said drag cover, said rotating member and said drag cover defining a space for accommodating therein the drag disks of the dual-bearing fishing reel, an annular channel formed concentrically with said rotating member in one of said opposing faces of said drag cover and said rotating member;

a tubular centering portion for fitting said drag cover concentrically to said rotating member, formed on an outer peripheral portion of the other of said opposing faces of said drag cover and said rotating member for a circumferentially snug fit in said annular channel;

a plurality of circumferentially spaced female-threaded portions formed peripherally outward of said annular channel and in one of said opposing faces of said drag cover and said rotating member;

a mounting portion provided peripherally outward of said annular channel on the other of said opposing faces of said drag cover and said rotating member, for contacting the one of said opposing faces, said mounting portion having a plurality of circumferentially spaced screw insertion holes formed complementarily to said female-threaded portions;

a ring-shaped seal member made of an elastic material, disposed for a circumferentially snug fit between said tubular centering portion and said annular channel; and a plurality of screw components for screwing into said plurality of female-threaded portions through said screw insertion holes.

20. A drag-cover mounting configuration as set forth in claim 19, further comprising an annular seal-stop groove formed circumferentially on said centering portion for stopping said seal member.

21. A drag-cover mounting configuration as set forth in claim 19, wherein said seal member is an O-ring.

22. A drag-cover mounting configuration as set forth in claim 19, further comprising an annular take-off groove for taking off the drag cover, formed circumferentially on the drag cover.

23. A drag-cover mounting configuration as set forth in claim 19, wherein said rotating member is the spool itself.

24. A drag-cover mounting configuration as set forth in claim 19, wherein the drag disks protrude axially from the inner peripheral side of the drag cover, and a waterproof seal is fitted between the drag cover and the protruding part of the drag disks.

* * * * *